(12) United States Patent
Delfino

(10) Patent No.: US 9,080,241 B2
(45) Date of Patent: Jul. 14, 2015

(54) SYSTEM FOR PRODUCING AND SUPPLYING HYDROGEN AND SODIUM CHLORATE, COMPRISING A SODIUM CHLORIDE ELECTROLYSER FOR PRODUCING SODIUM CHLORATE

(75) Inventor: Antonio Delfino, Clermont-Ferrand Cedex (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 79 days.

(21) Appl. No.: 13/806,345

(22) PCT Filed: Jun. 7, 2011

(86) PCT No.: PCT/EP2011/059379
§ 371 (c)(1),
(2), (4) Date: Jan. 16, 2013

(87) PCT Pub. No.: WO2012/000744
PCT Pub. Date: Jan. 5, 2012

(65) Prior Publication Data
US 2013/0115535 A1     May 9, 2013

(30) Foreign Application Priority Data
Jun. 29, 2010  (FR) ...................... 10 55215

(51) Int. Cl.
*H01M 8/06* (2006.01)
*C25B 1/14* (2006.01)
(Continued)

(52) U.S. Cl.
CPC ............... *C25B 1/14* (2013.01); *B60L 11/1803* (2013.01); *B60L 11/1881* (2013.01);
(Continued)

(58) Field of Classification Search
None
See application file for complete search history.

(56) References Cited

U.S. PATENT DOCUMENTS 3,608,660 A * 9/1971 Smith et al. .................. 180/69.5
4,628,010 A   12/1986 Iwanciow ..................... 429/19
(Continued)

FOREIGN PATENT DOCUMENTS

| EP | 1 460 704 A1 | 9/2004 |
| JP | 2002-308445 A | 10/2002 |
| JP | 2002363779 A * | 12/2002 |
| JP | 2006-96580 A | 4/2006 |

OTHER PUBLICATIONS

Honda: "FCX Clarity," presented at FCV Copenhagen Parade, Nov. 30, 2009, retrievable from the Internet at: http://bridge2h.com/wp-content/uploads/2009/11/FCH-Meeting-30nov-program-invitation-final.pdf.

*Primary Examiner* — Gregg Cantelmo
(74) *Attorney, Agent, or Firm* — Fitzpatrick, Cella, Harper & Scinto

(57) ABSTRACT

A system is provided for producing hydrogen and oxygen based on decomposition of sodium chlorate ($NaClO_3$). In a service station, $NaClO_3$ is produced by a sodium chloride (NaCl) electrolyser. The service station is supplied with water ($H_2O$), NaCl, and energy in order to carry out an electrolysis reaction in the electrolyser, to produce $NaClO_3$ and gaseous hydrogen ($H_2$). The $NaClO_3$ and $H_2$ are supplied to vehicles. Each vehicle includes a reactor for decomposing the $NaClO_3$ and producing reaction products of NaCl and oxygen, with the oxygen being supplied to a fuel cell.

6 Claims, 4 Drawing Sheets

(51) Int. Cl.
*C25B 1/04* (2006.01)
*C25B 9/18* (2006.01)
*C25B 9/00* (2006.01)
*B60L 11/18* (2006.01)
*C25B 1/26* (2006.01)
*H01M 8/04* (2006.01)

(52) U.S. Cl.
CPC .............. *B60L 11/1883* (2013.01); *C25B 1/04* (2013.01); *C25B 1/265* (2013.01); *C25B 9/00* (2013.01); *C25B 9/18* (2013.01); *H01M 8/04208* (2013.01); *H01M 8/065* (2013.01); *H01M 8/0606* (2013.01); *H01M 8/0656* (2013.01); *H01M 2250/20* (2013.01); *Y02E 60/366* (2013.01); *Y02E 60/50* (2013.01); *Y02T 90/32* (2013.01); *Y02T 90/34* (2013.01)

(56) References Cited

U.S. PATENT DOCUMENTS

| | | |
|---|---|---|
| 4,797,186 A | 1/1989 | Levy et al. .................... 204/129 |
| 5,372,617 A | 12/1994 | Kerrebrock et al. .............. 48/61 |
| 5,419,818 A | 5/1995 | Wanngard ....................... 204/95 |
| 5,655,692 A | 8/1997 | Navin et al. ................... 222/413 |
| 7,337,799 B2 | 3/2008 | Delfino et al. .................. 137/79 |
| 2004/0155149 A1 | 8/2004 | Dossas et al. .................. 244/128 |
| 2004/0185328 A1 | 9/2004 | Lin et al. ......................... 429/50 |
| 2005/0142403 A1 | 6/2005 | Ulmer et al. .................... 429/19 |
| 2007/0051241 A1 | 3/2007 | Boyd et al. ..................... 96/108 |
| 2007/0128485 A1 | 6/2007 | Zhao et al. ...................... 429/26 |
| 2007/0196702 A1 | 8/2007 | Sridhar et al. ................. 429/17 |
| 2008/0160387 A1 | 7/2008 | Delfino ........................... 429/34 |

\* cited by examiner ized gas presents certain risks. The pressure has to be limited as the gas becomes extremely dangerous when the pressure exceeds 200 bar. During an adiabatic reduction in pressure, many

SYSTEM FOR PRODUCING AND SUPPLYING HYDROGEN AND SODIUM CHLORATE, COMPRISING A SODIUM CHLORIDE ELECTROLYSER FOR PRODUCING SODIUM CHLORATE

TECHNICAL FIELD OF THE INVENTION

The present invention relates to a system for producing and supplying hydrogen and oxygen for a fuel cell electrical vehicle and also relates to a corresponding service station, part of a system for producing and supplying hydrogen and oxygen.

STATE OF THE PRIOR ART

Vehicles using a fuel cell operating with pure oxygen and hydrogen exhibit several advantages with respect to the fuel cell operating with atmospheric oxygen. These advantages include in particular the following distinctive features: the power density is higher (compactness), the system for controlling the gases from the fuel cell is greatly simplified, it is not necessary to moisten the gases entering the fuel cell, the cost is lower for a given power, the output of the system is higher, the air compressor is dispensed with and no polluting gas is introduced into the fuel cell by the air.

All the same, some major disadvantages remain. First, the on-board weight of the high-pressure oxygen tank is relatively high and, secondly, the use of pressurized gas presents certain risks. The pressure has to be limited as the gas becomes extremely dangerous when the pressure exceeds 200 bar. During an adiabatic reduction in pressure, many materials ignite spontaneously on contact with the oxygen.

The invention provides various technical means for overcoming these various disadvantages.

ACCOUNT OF THE INVENTION

First of all, a first aim of the invention consists in providing a production and supply system for an electrical vehicle which is ecological and safe.

Another aim consists in providing a service station which makes it possible to supply the vehicles in an optimum fashion.

In order to do this, the invention first of all provides a system for producing and supplying hydrogen and oxygen for an electrical vehicle comprising, first:

a plurality of service stations each comprising at least one NaCl electrolyser, which are provided in order to supply vehicles capable of being connected to the service stations with a supply of hydrogen and a supply of $NaClO_3$;

a plurality of vehicles which can be connected to the said service stations in order to receive the said supplies of hydrogen and sodium chlorate for storage in the vehicles in separate tanks;

the vehicles comprising means for transforming the hydrogen and the sodium chlorate into electrical energy in order to supply at least one item of electrical equipment of the vehicle.

The means for transforming the hydrogen and the sodium chlorate ($NaClO_3$) into electrical energy preferably comprise a fuel cell supplied with pure oxygen and with hydrogen. Each vehicle advantageously comprises a reactor for the decomposition of sodium chlorate which makes it possible to load sodium chlorate into a vehicle (submarine, aircraft, car, motorcycle, and the like) in order to produce, in situ, the oxygen for use in the fuel cell and thus to avoid the disadvantages related to the high-pressure storage and to safety.

Thus, the invention offers a practical solution for the manufacture of oxygen other than by electrolysis of water.

It is observed that the decomposition products of sodium chlorate ($NaClO_3$) are sodium chloride or salt (NaCl) and oxygen. The salt can optionally be used again to recreate the sodium chlorate. The oxygen is used to supply the fuel cell. This is a clean fuel, providing a high output, contributing, first, to generating a large amount of energy and, secondly, to being friendly to the environment in which the vehicle is moving.

According to another advantageous embodiment of the invention, the service stations are connected to electrical supply sources which make it possible to provide the energy required to generate an electrolysis reaction.

Furthermore, the invention provides a vehicle comprising:
a fuel cell;
a supplying of the fuel cell based on hydrogen and oxygen which are supplied by an on-board system for supplying hydrogen and an on-board system for supplying oxygen;
in which the system for supplying with hydrogen comprises a tank at substantially low pressure for storage of the gas using metal hydrides, the said tank being in contact in fluid fashion with the fuel cell in order to supply the latter with hydrogen;
and in which the system for supplying with oxygen comprises an $NaClO_3$ tank, a reactor for decomposition of the $NaClO_3$ in contact in fluid fashion with the $NaClO_3$ tank and connected to the fuel cell in order to supply the latter with oxygen after decomposition of the $NaClO_3$.

Advantageously, the $NaClO_3$ and hydrogen tanks each comprise filling pipes which can be connected to an external source for filling the tanks.

The system for supplying with oxygen is advantageously designed so as to be able to provide the $NaClO_3$ in substantially solid form to the decomposition reactor.

According to an advantageous alternative form, the $NaClO_3$ is provided to the reactor by a mechanical supply system, such as, for example, by an endless screw, or by gravity.

The invention finally provides a service station for vehicles, the said service station comprising:
at least one NaCl electrolyser, for producing hydrogen and $NaClO_3$;
a supply of water, for the electrolysis reaction;
a supply of NaCl, for the electrolysis reaction;
a supply of electrical energy, for the electrolysis reaction;
an outlet for $NaClO_3$ and an outlet for $H_2$, which products result from the electrolysis reaction, in order to supply a vehicle connected to the said service station.

Advantageously, such a service station is incorporated in a system described above and furthermore comprises intermediate storage tanks for the storage of hydrogen and $NaClO_3$ before filling the tanks of the vehicles.

DESCRIPTION OF THE FIGURES

All the implementational details are given in the description which follows, supplemented by FIGS. 1 to 4, which are presented solely for the purposes of non-limiting examples and in which.

DETAILED DESCRIPTION OF THE INVENTION

Figure 1:
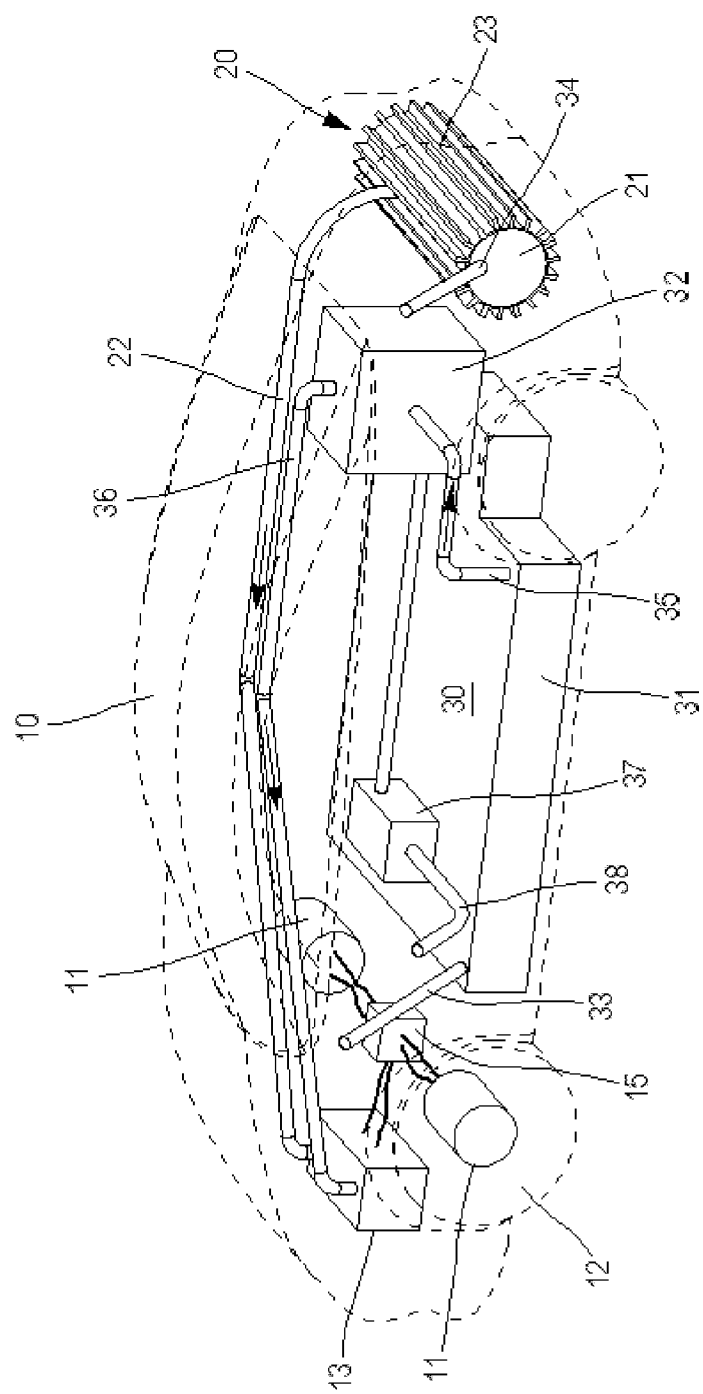
FIG. 1 diagrammatically represents a vehicle of electrical engine type with a low-pressure hydrogen tank according to the invention.

FIG. 1 shows an example of a vehicle 10, the propulsion means of which, in this example electric motors 11 incorporated in the wheels 12, are supplied by means of a fuel cell 13. The fuel cell operates conventionally, based on hydrogen and oxygen. The cell thus makes it possible to generate continuous current, sent via a DC/DC converter 15 to the two motors, provided in the front wheels of the vehicle illustrated. The DC/DC converter makes it possible to adjust the voltage provided by the cell to that required by the motors. For example, for a cell providing a voltage of 90 to 150 volts, the converter increases the voltage, for example to values which can lie between 250 and 300 volts. According to other implementational examples, motors are provided which are incorporated in the rear wheels of the vehicle or also a single motor is provided, coupled to transmission means of known type.

The hydrogen provided to the cell 13 advantageously originates from a hydrogen supply system 20 comprising a hydrogen tank 21 at substantially low pressure which makes possible storage of metal hydrides. This advantageous storage means makes it possible to optimize the amount of gas, making it possible, for example, to be able to store a large amount of hydrogen at a relatively low pressure lying between 3 and 15 bar. The storage system comprising metal hydrides is described in more detail a little later in the description.

A hydrogen pipe 22 makes it possible to connect the hydrogen tank 21 to the fuel cell 13.

Figure 3:
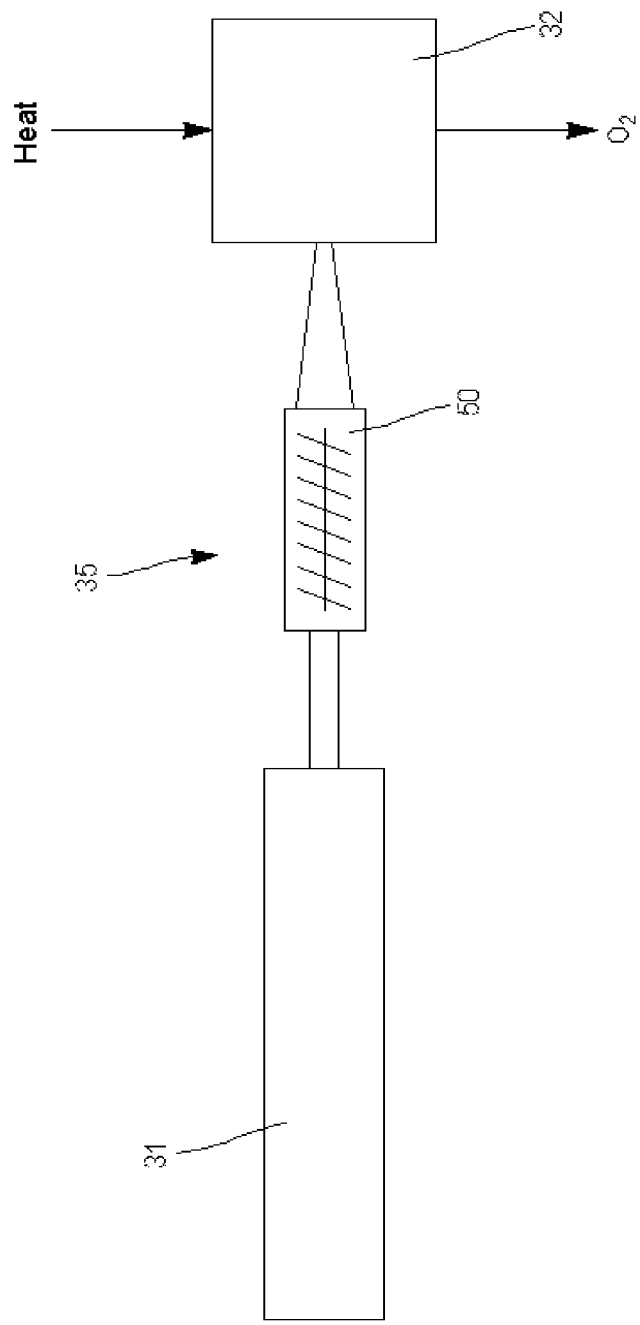
FIG. 3 shows an example of a means used to allow the $NaClO_3$ to be transported, in this example an endless screw.
Figure 4:
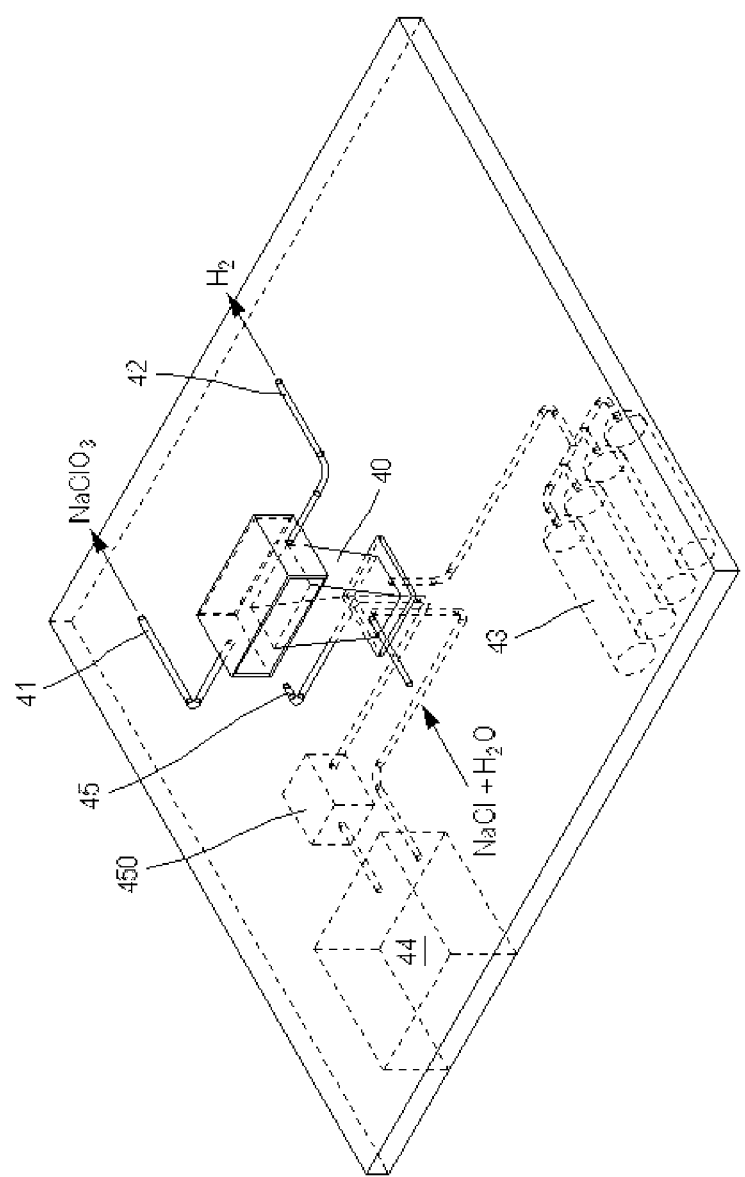
FIG. 4 presents an example of a service station provided with intermediate storage tanks.

The oxygen provided to the cell advantageously originates from a reactor 32 for the decomposition of $NaClO_3$ placed, by means of a transfer line 35, in contact in fluid fashion with a sodium chlorate tank 31. FIG. 3 shows an example of a means which makes it possible to supply sodium chlorate from the sodium chlorate tank 31 to the reactor 32. In this example, an endless screw 50, positioned between the two components, is used to withdraw the chlorate, in the powder form, from the sodium chlorate tank 31 and to transport it to the reactor 32. In an alternative embodiment (not illustrated), the sodium chlorate is transported to the reactor 32, positioned substantially under the sodium chlorate tank 31, by gravity.

The onboard sodium chlorate is decomposed by the reactor installed in the vehicle in proportion to the demand for oxygen coming from the fuel cell. The decomposition of the sodium chlorate is governed by the following reaction:

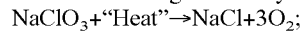
$NaClO_3$+"Heat"→NaCl+3$O_2$;

as this reaction is endothermic, it consumes energy on board the vehicle; the necessary energy is withdrawn from the electrical energy produced by the fuel cell; however, the output of this reaction is very high and the overall energy balance on board the vehicle remains very advantageous, the share of energy withdrawn from the fuel cell in order to thus supply it with oxygen remaining modest.

The oxygen resulting from the reaction of the reactor 32 is transported to the fuel cell 13 via an oxygen pipe 36. Rather than disperse the sodium chloride (NaCl) as it is produced, it is stored on board the vehicle, in a sodium chloride storage tank 37, in order to be able to discharge it, via a discharge pipe 38, at the service station and, in a very particularly advantageous use, the recycling of this product is carried out on the spot, as is explained below.

Figure 2:
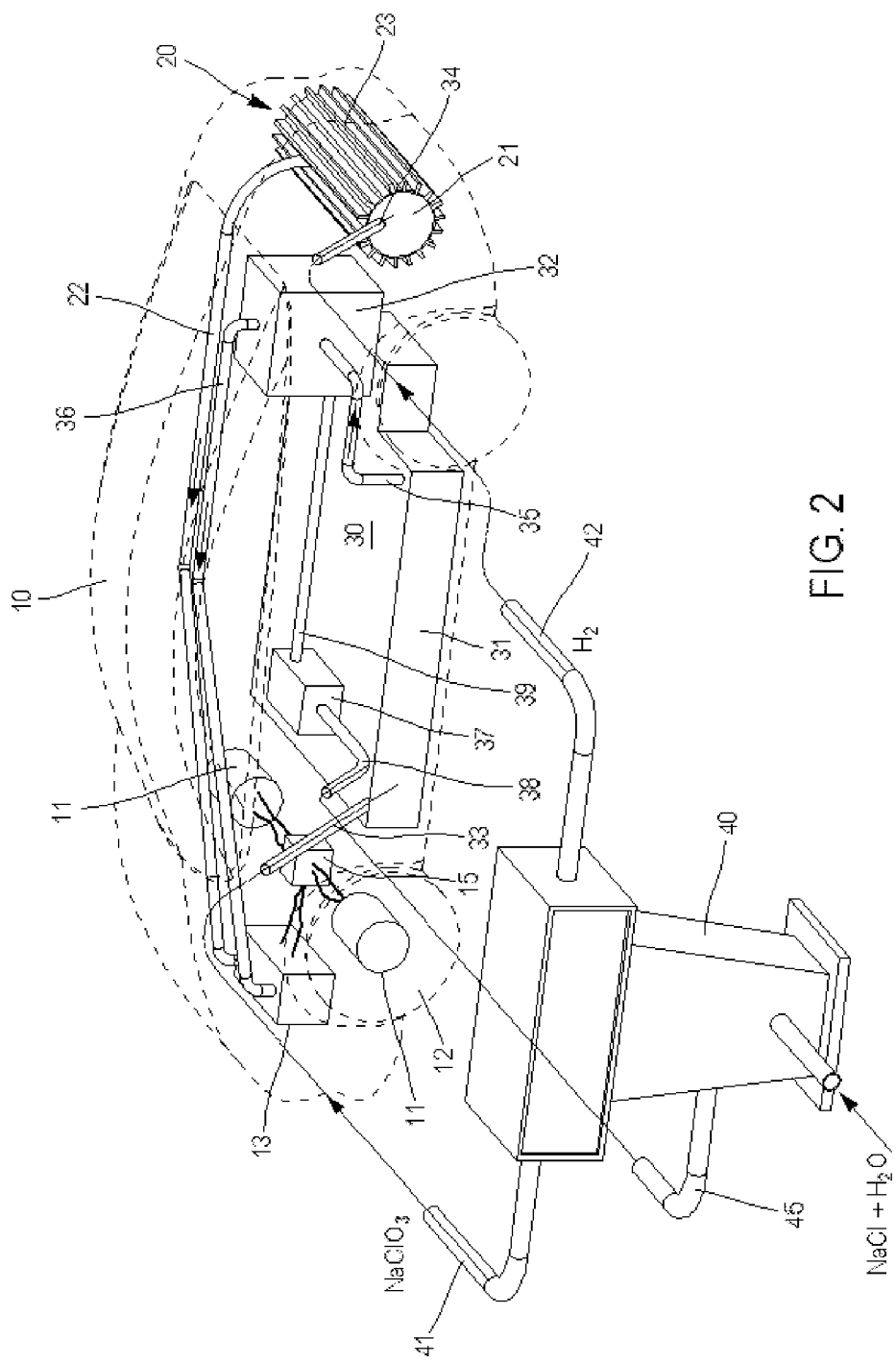
FIG. 2 shows the same vehicle in connection with a service station.

The sodium chlorate tank 31 and the hydrogen tank 21 are supplied with sodium chlorate, on the one hand, and with hydrogen, on the other hand, when the vehicle 10 is connected to a service station 40, as presented in FIG. 2. The service station 40 is equipped with two sites 41 and 42 for connecting to the filling pipes 33 and 34 of the vehicle. The service station 40 is also equipped with a connection 45 for connecting to the discharge pipe 38 of the vehicle.

The service station 40 is designed to produce sodium chlorate and hydrogen using at least one NaCl electrolyser. The service station must furthermore be supplied with water, salt and energy in order to make possible the electrolysis reaction. Thus, at a service station, the salt (NaCl) mixed with water ($H_2O$), at least in part recovered by emptying the vehicles, as set out above, is electrolysed so as to produce sodium chlorate ($NaClO_3$) and hydrogen ($H_2$). The following chemical reaction illustrates it.

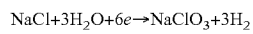
NaCl+3$H_2$O+6e→$NaClO_3$+3$H_2$

It is observed that this reaction produces gaseous hydrogen and solid sodium chlorate which includes three oxygen atoms. The sodium chlorate can thus be easily stored without having recourse to a pressurized tank with all the constraints related to this. Furthermore, sodium chlorate is not dangerous. Consequently, it can be easily transportable in a vehicle without danger. Intermediate storage tanks for the hydrogen 43 and/or for the $NaClO_3$ 44 are advantageously provided in the service station. The service station also comprises a storage vessel 450 for the sodium chloride originating from the vehicles via the connection 45, everything with the technical means appropriate for providing for the transfer of the said sodium chloride (endless screw or other suitable means). These holding tanks and storage vessel make it possible to produce the hydrogen and the sodium chlorate with complete freedom and with more flexibility, without real-time supplying constraint. For the service station, the storage constraints for the hydrogen are not as severe as on a vehicle. Thus, the hydrogen holding tank of the service station can be either a pressurized tank or alternatively a tank with hydrides, similar to that of a vehicle, but preferably with a volume corresponding to the recharging of several vehicles. Transportation means of known type, such as, for example, pipes provided with endless screws, make it possible to transfer the $NaClO_3$ from the holding tank to the vehicle to be supplied.

It should also be emphasized that, since, according to the scheme provided by the invention, each vehicle produces sodium chloride (NaCl) and since each service station consumes sodium chloride, preferably, each service station has available an item of equipment (not represented in the drawings) for collecting the sodium chloride stored on board the vehicle, in order to recycle it in the service station for the production of the sodium chlorate ($NaClO_3$).

In order to store the hydrogen in an optimal fashion, tanks comprising metal hydrides are advantageously provided on board the vehicles. With such tanks, the metal compound acts as a hydrogen sponge. There exist several metals and metal alloys which have the property of absorbing hydrogen in their crystal lattice. During the filling of a tank, the molecular hydrogen $H_2$ diffusing in the metal is stored in the atomic form H. The molecular bond is weakened and a release of heat ensues (exothermic reaction). It is therefore advantageous to provide a cooling means which makes it possible to cool the tank during the filling. In the example of FIG. 1, the hydrogen tank is provided with fins 23 which make possible sufficient cooling if the charging time is not too short. For more efficient cooling, a liquid-based cooling system can be provided.

Conversely, in order to empty the tank, an energy supply is required in order to recreate the molecular bond when the atomic hydrogen leaves the hydride. In order to be able to be carried out, the endothermic reaction requires drawing energy from the surroundings, so that the tank cools. Advantageously, a supply of energy makes it possible to optimize the expulsion of the hydrogen. The cooling water of the fuel cell, once charged with heat energy, can make it possible to provide a portion or all of the energy required.

The most well known metal hydrides are: $FeTiH_{1.7}$, $LaNi_5H_6$, $MgH_2$ and $Mg_2NiH_2$.

The weight of hydrogen stored in the tank per unit of volume is undoubtedly one of the greatest advantages of such a tank configuration with metal hydrides. The weight by volume of hydrogen stored lies within 60 g/l and 130 g/l. By way of comparison, the hydrogen compressed at 350 bar in a tank made of composite (for example made of resin carbon fibres) has a density of 25 g/l. For liquid hydrogen, 71 g/l are obtained. This amounts to saying that the technology of metal hydrides makes it possible to store a great deal of hydrogen in a small volume.

The invention claimed is:

1. A fueling system for an electrical automobile, the fueling system comprising:
    a service station for providing a supply of hydrogen and a supply of sodium chlorate ($NaClO_3$) to an electrical automobile when the electrical automobile is connected to the service station, the service station including at least one sodium chloride (NaCl) electrolyser;
    a first supply line for supplying the $NaClO_3$ from the service station to the electrical automobile;
    a second supply line for supplying the hydrogen from the service station to the electrical automobile;
    a supply system for supplying NaCl, water, and energy to the service station; and
    a discharge pipe for transporting NaCl discharged from the electrical automobile to the service station,
    wherein the at least one NaCl electrolyser utilizes the NaCl, the water, and the energy from the supply system to produce $NaClO_3$ and hydrogen.

2. The fueling system according to claim 1, further comprising a storage container for storing the NaCl discharged from the electrical automobile.

3. The fueling system according to claim 1, wherein the energy supplied to the service station is used to generate an electrolysis reaction in the at least one NaCl electrolyser.

4. The fueling system according to claim 1, further comprising intermediate storage tanks for storing the supply of hydrogen and the supply of $NaClO_3$ to be delivered to the electrical automobile.

5. The fueling system according to claim 1, further comprising a second service station same as the service station.

6. The fueling system according to claim 1, further comprising the electrical automobile, wherein the electrical automobile includes:
    a first storage vessel for storing the $NaClO_3$ received from the service station,
    a second storage vessel for storing hydrogen received from the service station,
    a reactor for producing oxygen from the $NaClO_3$ received from the service station, and
    a fuel cell for converting the hydrogen from the second storage vessel and the oxygen produced by the reactor into electrical energy used by the electrical automobile.

* * * * *